United States Patent [19]
Shimada et al.

[11] Patent Number: 5,704,874
[45] Date of Patent: Jan. 6, 1998

[54] SHIFT CONTROL METHOD FOR AUTOMATIC TRANSMISSION

[75] Inventors: Takamichi Shimada, Sakado; Noboru Sekine, Kasukabe, both of Japan

[73] Assignee: Honda Giken Kogyo Kabushiki Kaisha, Tokyo, Japan

[21] Appl. No.: 626,892

[22] Filed: Apr. 3, 1996

[30] Foreign Application Priority Data

Apr. 3, 1995 [JP] Japan .................................. 7-101781

[51] Int. Cl.$^6$ .................................................. F16H 61/06
[52] U.S. Cl. ............................ 477/154; 477/143; 477/155
[58] Field of Search ........................... 477/154, 155, 477/129, 143

[56] References Cited

U.S. PATENT DOCUMENTS

| | | | |
|---|---|---|---|
| 4,955,257 | 9/1990 | Terayama et al. | 477/154 |
| 5,014,573 | 5/1991 | Hunter et al. | 477/155 X |
| 5,046,383 | 9/1991 | Butts et al. | 477/155 X |
| 5,058,460 | 10/1991 | Hibner et al. | 477/155 X |
| 5,072,390 | 12/1991 | Lentz et al. | 477/155 X |
| 5,165,308 | 11/1992 | Asada et al. | 477/155 X |
| 5,311,795 | 5/1994 | Yoshimura et al. | 477/131 X |
| 5,409,421 | 4/1995 | Sakai et al. | 477/143 X |
| 5,443,427 | 8/1995 | Ataka et al. | 477/154 X |
| 5,468,198 | 11/1995 | Holbrook et al. | 477/143 |
| 5,551,930 | 9/1996 | Creger et al. | 477/155 X |

FOREIGN PATENT DOCUMENTS 62-246653 10/1987 Japan .

*Primary Examiner*—Khoi Q. Ta
*Assistant Examiner*—Peter T. Kwon
*Attorney, Agent, or Firm*—Lyon & Lyon LLP

[57] ABSTRACT

A shift control method for executing a shift-up control from an off-going range to an on-coming range comprises an off-going-range releasing stage, an off-going-range controlling stage, and an on-coming-range invalid-stroke-clearing stage. In the off-going-range releasing stage, a pressure command signal is generated to quickly lower the engagement-actuation pressure of the off-going engaging element. In the off-going-range controlling stage, a pressure command signal is generated to control the engagement-actuation pressure of the off-going engaging element in such a way that the off-going engaging element is kept slipping within a predetermined range of input/output rotational speed ratio (=output rotational speed/input rotational speed). In the on-coming-range invalid-stroke-clearing stage, a pressure command signal is generated to set the engagement-actuation pressure of the on-coming engaging element to a predetermined high-pressure which is necessary for the on-coming engaging element to clear its invalid stroke. This shift-up control initiates the on-coming-range invalid-stroke-clearing stage in response to a shift-up command and proceeds from the off-going-range releasing stage to the off-going-range controlling stage when the input/output speed ratio of the off-going engaging element reaches a first predetermined value in the off-going-range releasing stage. Then, pressure command signals are generated sequentially first to engage the on-coming engaging element in a predetermined engaging pattern and then to completely release the off-going engaging element.

11 Claims, 9 Drawing Sheets

SHIFT CONTROL METHOD FOR AUTOMATIC TRANSMISSION

FIELD OF THE INVENTION

The present invention relates generally to an automatic transmission for use in vehicles, and particularly to a shift control method for controlling hydraulic pressure which actuates engaging elements of off-going and on-coming speed ranges while the transmission is shifting up.

BACKGROUND OF THE INVENTION

Automatic transmissions are composed of a plurality of gear trains. These gear trains establish a plurality of power transmission paths for the purpose of shifting speed ranges when such elements as clutches and brakes are selectively actuated for engagement through hydraulic pressure. When speed ranges are being shifted, an element establishing an off-going speed range (off-going engaging element) through one of the power transmission paths is released, and another element to establish an on-coming speed range (on-coming engaging element) through another power transmission path is engaged.

In order to execute such shifts smoothly without lag, engagement and disengagement of the engaging elements are precisely timed, and engaging forces applied to the engaging elements are appropriately controlled for engagement and disengagement. For example, Japanese Laid-Open Patent Publication No. 62-246653 proposes a method which, after a shift command is generated, reduces the actuation pressure of the off-going engaging element, thereby allowing some slip in the off-going engaging element, and reduces the invalid stroke of the on-coming engaging element. After the on-coming engaging element starts engaging, the off-going engaging element is released, and the actuation pressure of the on-coming engaging element is gradually increased. The term "invalid stroke" means a piston stroke in the cylinder of an engaging element through which no engaging force is applied on the engaging element (such as clutches and brakes).

However, if the off-going engaging element is released too late or too early, then there may be a shift shock problem or an engine racing problem when the on-coming engaging element engages, i.e., a shift to another speed range completes. On the other hand, in the case of a shift control executed while the off-going engaging element is kept slipping as mentioned above, there may be a problem of the off-going engaging element being easily heated up or worn down if the engaging element is kept slipping under a heavy share of the input torque for a long period. Moreover, if the on-coming engaging element is not precisely timed for engagement with respect to the release of the off-going engaging element, then there may be a problem of shift shock or shift delay.

SUMMARY OF THE INVENTION

It is an object of the present invention to provide a shift control method for an automatic transmission which allows a smooth shift of speed ranges without any lag.

It is an other object of the present invention to provide a shift control method for an automatic transmission which is capable of minimizing wear of the off-going engaging element while shifting speed ranges.

In order to achieve these objects, a shift control method of the present invention comprises an off-going-range releasing stage, an off-going-range controlling stage, and an on-coming-range invalid-stroke-clearing stage. In the off-going-range releasing stage, a pressure command signal is generated to quickly lower the engagement-actuation pressure of the off-going engaging element. In the off-going-range controlling stage, a pressure command signal is generated to control the engagement-actuation pressure of the off-going engaging element in such a way that the off-going engaging element is kept slipping within a predetermined range of input/output rotational speed ratio (=output rotational speed/input rotational speed). In the on-coming-range invalid-stroke-clearing stage, a pressure command signal is generated to set the engagement-actuation pressure of the on-coming engaging element to a predetermined high-pressure which is necessary for the on-coming engaging element to clear its invalid stroke. This shift-up control initiates the on-coming-range invalid-stroke-clearing stage in response to a shift-up command and proceeds from the off-going-range releasing stage to the off-going-range controlling stage when the input/output speed ratio of the off-going engaging element reaches a first predetermined value in the off-going-range releasing stage. Then, a pressure command signal is generated to engage the on-coming engaging element in a predetermined engaging pattern when the input/output speed ratio of the off-going engaging element reaches a second predetermined value greater than the first predetermined value in the off-going-range controlling stage. After the engagement of the on-coming engaging element, a pressure command signal is generated to completely release the off-going engaging element when the input/output speed ratio of the off-going engaging element reaches a third predetermined value greater than the second predetermined value in the off-going-range controlling stage.

As shift-up command, there are power-on shift-up command and power-off shift-up command. A power-on shift-up command is generated while the throttle is kept open, and a power-off shift-up command is generated while the throttle is kept substantially closed. For either command, the first predetermined value is a value smaller than 1.0; the second predetermined value is a value greater than the first predetermined value but smaller than 1.0; and the third predetermined value is a value greater than 1.0.

In the case of a power-on shift-up command, the off-going-range releasing stage is initiated when a first predetermined time period T1 elapses after the power-on shift-up command has been generated, and the on-coming-range invalid-stroke-clearing stage is initiated when a second predetermined time period T2 (>T1) elapses after the power-on shift-up command has been generated.

The above mentioned engagement control of the on-coming engaging element, which is executed when the input/output rotational speed ratio of the off-going engaging element reaches the second predetermined value in the off-going-range controlling stage, comprises an on-coming-range stand-by stage which generates a pressure command signal for increasing the engagement-actuation pressure of the on-coming engaging element at a first predetermined rate from a predetermined pressure. This on-coming-range stand-by stage includes an on-coming-range first stand-by stage and an on-coming-range second stand-by stage. In the on-coming-range first stand-by stage, a pressure command signal is generated to keep the engagement-actuation pressure of the on-coming engaging element at a predetermined pressure for a first predetermined time period. Following this on-coming-range first stand-by stage, a pressure command signal is generated to increase the engagement-actuation pressure of the on-coming engaging element at a first predetermined rate in the on-coming-range second stand-by stage.

It is preferable that the shift control method further comprise an on-coming-range controlling stage which generates a pressure command signal for controlling the engagement-actuation pressure of the on-coming engaging element in such a way that the input/output rotational speed ratio of the on-coming engaging element will approach 1.0 at a second predetermined rate. Thereby, the shift-up control proceeds from the on-coming-range stand-by stage to the on-coming-range controlling stage when the input/output rotational speed ratio of the off-going engaging element reaches the third predetermined value in the off-going-range controlling stage.

It is also preferable that a pressure command signal be generated to completely engage the on-coming engaging element when a predetermined time period T5 elapses after the input/output rotational speed ratio of the on-coming engaging element has reached a fourth predetermined value approximately 1.0 in the on-coming-range controlling stage.

For a power-off shift-up command, it is preferable that the off-going-range releasing stage and the on-coming-range invalid-stroke-clearing stage be executed almost at the same time the power-off shift-up command is generated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
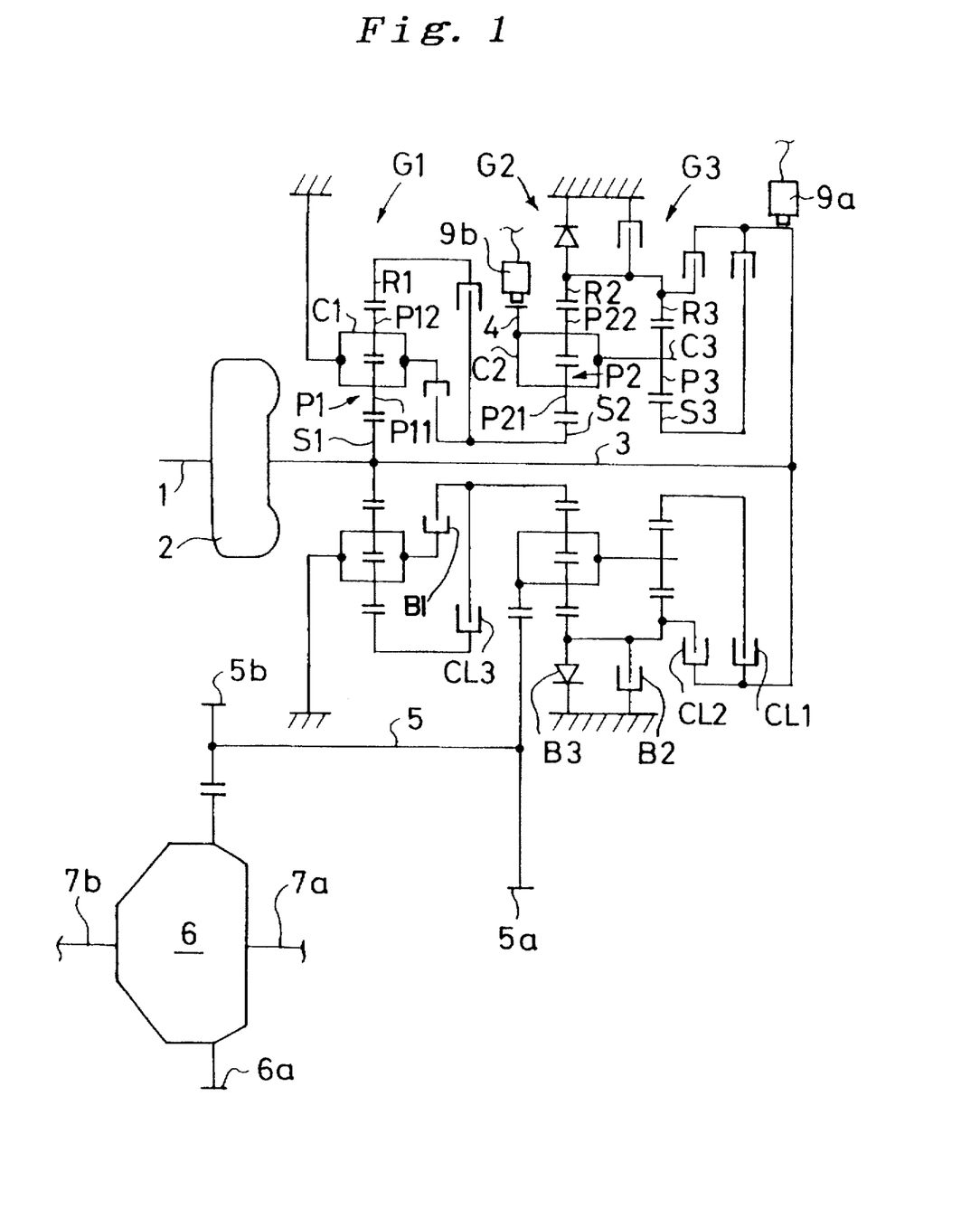
FIG. 1 is a schematic diagram of an automatic transmission which is controlled by a shift control method of the present invention.

FIG. 1 shows a power transmission system for use in an automatic transmission which is controlled by a shift control method of the present invention.

This transmission comprises a torque converter 2 connected to an engine output shaft 1, an input shaft 3 connected to a turbine shaft of the torque converter 2, and a planetary transmission mechanism mounted on the input shaft 3.

The planetary transmission mechanism has first, second, and third planetary gear trains G1, G2 and G3 juxtaposed on the input shaft 3. The first, second, and third planetary gear trains comprise respective first, second, and third sun gears S1, S2 and S3 positioned centrally; respective first, second, and third planetary pinions P1, P2 and P3 in mesh with the first, second and third sun gears S1, S2 and S3, respectively, and revolving therearound while rotating about their own axes; respective first, second, and third carriers C1, C2 and C3 which support the respective planetary pinions P1, P2 and P3 rotatably and rotate therewith around the sun gears S1, S2 and S3, respectively; and respective first, second and third ring gears R1, R2 and R3, whose internal gear teeth mesh with the planetary pinions P1, P2 and P3, respectively.

The first and second planetary gear trains G1 and G2 are double-pinion planetary gear trains. The first and second pinions P1 and P2 comprise two pinions each P11 and P12, and P21 and P22, respectively.

The first sun gear S1 is connected to the input shaft 3 at all times, and the first carrier C1 is fixed and retained to a housing. This first carrier C1 is coupled to the second sun gear S2 through a first brake B1. The first ring gear R1 is engageably and disengageably coupled to the second sun gear S2 through a third clutch CL3. The second carrier C2 is coupled with the third carrier C3 at all times, and they are coupled to an output gear 4 at all times. The second ring gear R2 is coupled with the third ring gear R3 at all times, and they can be held against rotation by a second brake B2. Besides this second brake B2, they are also connected to the housing through a one-way brake B3, thus not rotatable in a forward drive direction. Furthermore, the second and third ring gears R2 and R3 are engageably and disengageably connected to the input shaft 3 through a second clutch CL2, and the third sun gear S3 is engageably and disengageably connected to the input shaft 3 through a first clutch CL1.

Furthermore, input and output rotation sensors 9a and 9b are provided as shown in the figure.

In the above described transmission, shifts of speed ranges are carried out by selectively engaging and disengaging the first, second and third clutches CL1, CL2 and CL3 and the first and second brakes B1 and B2. Specifically, five forward speed ranges (1ST, 2ND, 3RD, 4TH and 5TH) and one reverse speed range (REV) can be established by selectively engaging the clutches and brakes as indicated in Table 1 below.

In the table, the second brake B2 in the 1ST speed range is marked by a circle in parentheses to indicate that the 1ST speed range can be established by the one-way brake B3 with or without the engagement of the second brake B2. This means that when the first clutch CL1 is engaged, the 1ST speed range can be established without the engagement of the second brake B2. However, since the one-way brake B3 does not allow power transmission in the direction opposite to a forward drive direction, no engine brake is available in the 1ST speed range which is established without the engagement of the second brake B2. On the other hand, engine brake is available in the 1ST speed range if it is established with the engagement of the second brake B2. Thus, the 1ST speed range in the forward range D does not allow engine brake.

TABLE 1

| Speed range | CL1 | CL2 | CL3 | B1 | B2 |
|---|---|---|---|---|---|
| 1ST | O | | | | (O) |
| 2ND | O | | | O | |
| 3RD | O | | O | | |
| 4TH | O | O | | | |
| 5TH | | O | O | | |
| REV | | | O | | O |

Figure 2:
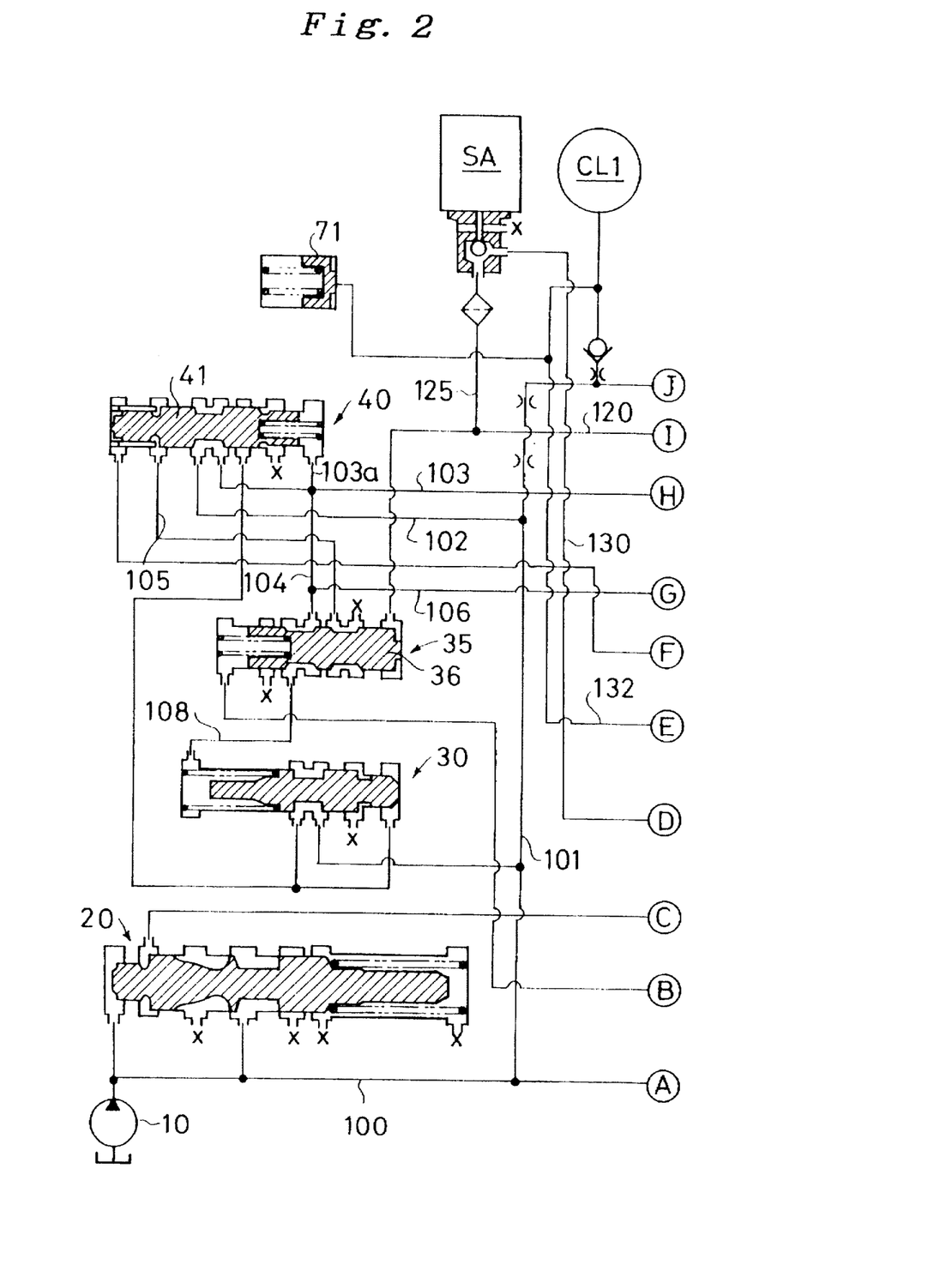
FIG. 2 is a partial hydraulic circuit diagram showing components of a shift control apparatus to which the shift control method is applied.
Figure 3:
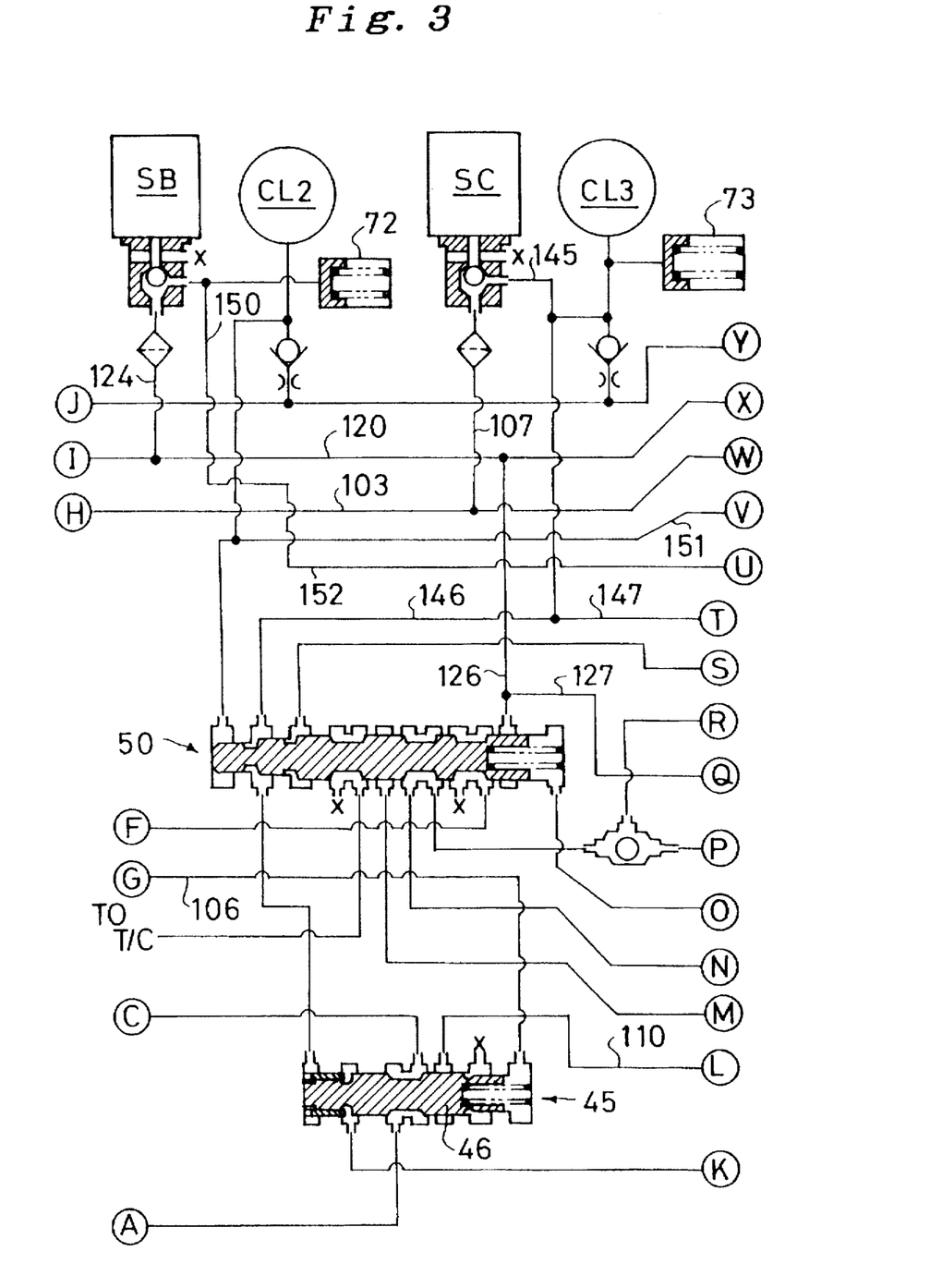
FIG. 3 is another partial hydraulic circuit diagram showing components of the shift control apparatus.
Figure 4:
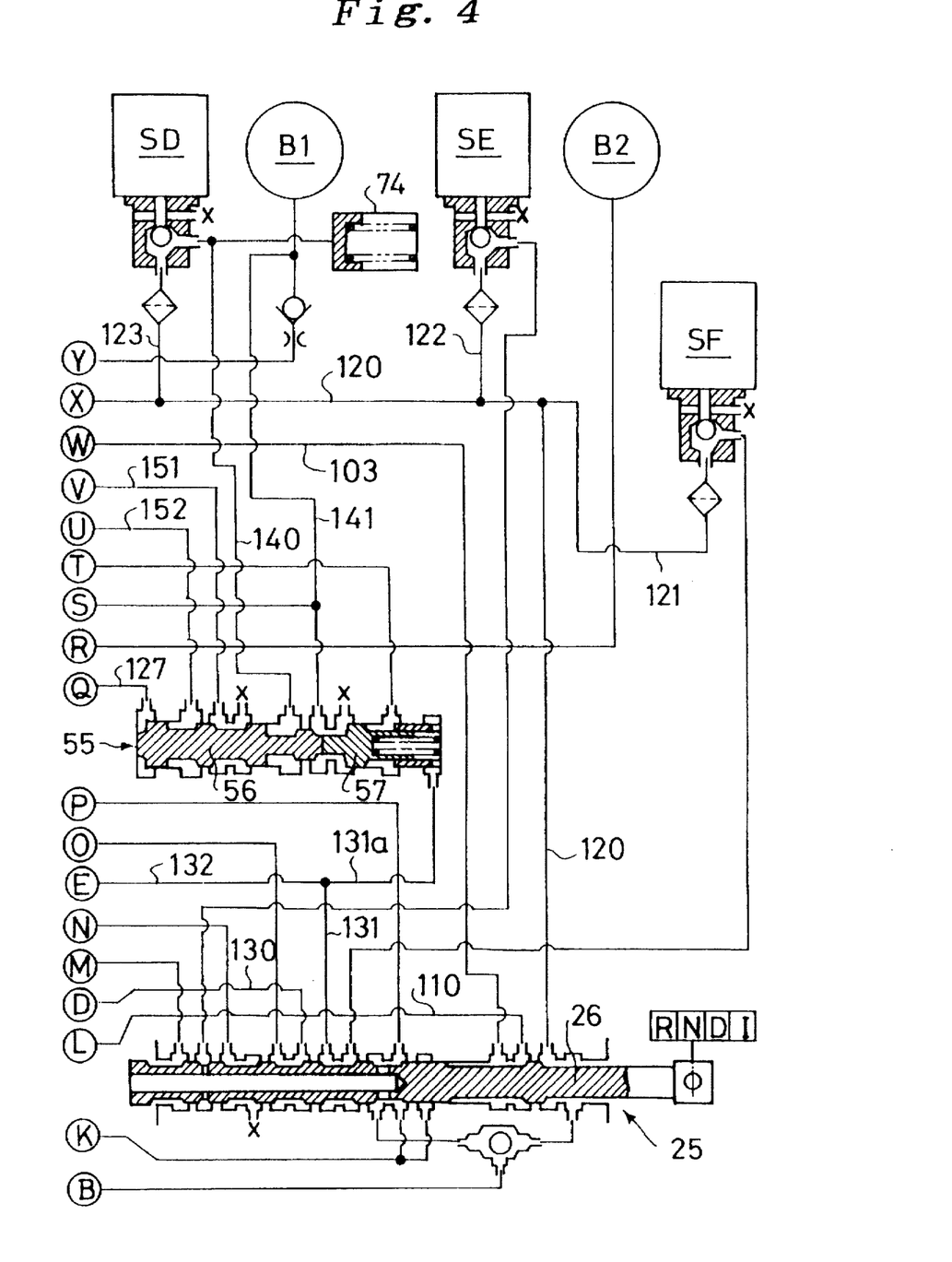
FIG. 4 is yet another partial hydraulic circuit diagram showing components of the shift control apparatus.

With reference to FIGS. 2, 3 and 4, a control apparatus for controlling engagement and disengagement of the first, second and third clutches CL1, CL2 and CL3 and the first and second brakes B1 and B2 will be described below. Each of the three drawings shows a respective portion of the control apparatus, composing a unified hydraulic circuit. Lines terminated with an identical alphabet (A~Y) in a circle in each drawing are continuous to each other, and lines marked with "X" are connected to a drain.

This control apparatus is supplied with working oil by a hydraulic pump 10. This oil is first adjusted to a line pressure P1 by a regulator valve 20 and sent out through a line 100 as shown in the figures.

Besides this regulator valve 20, the control apparatus has a manual valve 25; six solenoid valves SA~SF; six hydraulic valves 30, 35, 40, 45, 50 and 55; and four accumulators 71, 72, 73 and 74. The manual valve 25 is connected to a shift lever at the driver's seat, and it is manually operated by the driver. The solenoid valves SA, SC and SF are normally-open type, so these valves are open while the solenoids are not energized. The solenoid valves SB, SD and SE are normally-close type, so these valves are closed while the solenoids are not energized.

In the following description, valves are each referred to as reducing valve 30, L-H shift valve 35, FWD pressure-switching valve 40, REV pressure-switching valve 45, delivery valve 50, and relief valve 55.

These hydraulic valves are actuated in response to the operation of the manual valve 25 and the solenoid valves SA~SF for the purpose of executing a shift control. Table 2 below shows the relation of the operation of the solenoid valves to the establishment of the speed ranges. "ON" and "OFF" in the table represent the turning on and off, respectively, of the solenoids. The operation of the solenoid valve SF is not shown in the table because it is not used for establishing a speed range but used only for increasing the line pressure when the reverse speed range is established.

TABLE 2

| Speed ranges | SOLENOID-OPERATED VALVE | | | | |
|---|---|---|---|---|---|
| | SA | SB | SC | SD | SE |
| Type | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | OFF | OFF | OFF | OFF |

N/O: Normally-open; N/C: Normally-closed; and L/C: Lockup clutch.

At first, description is given of a shift control which takes place when the D range (forward range) is selected with the shift lever moving a spool 26 in the manual valve 25 from position N, the position of the spool 26 shown in FIG. 4, to position D. When a hook on the right end of the spool 26 is positioned at "D", oil under the line pressure P1 is delivered to the manual valve 25 through lines 101 and 102 branched from the line 100 and then through a spool groove in the FWD pressure-switching valve 40 and a line 103. Then, the line pressure P1 is delivered through a groove on the spool 26 to lines 110 and 120. In this instance, the line 110 is closed off by the REV pressure-switching valve 45.

The oil under the line pressure P1 is then supplied from the line 120 to the solenoid valves SF, SE, SD, SB and SA through branched lines 121, 122, 123, 124 and 125, respectively. The line pressure P1 in the line 120 also acts on the right end of the L-H shift valve 35, moving a spool 36 thereof to the left. A line 126 branching from the line 120 is connected to the right end of the delivery valve 50, and a line 127 branching from the line 126 is connected to the left end of the relief valve 55, whereby spools 56 and 57 in the relief valve 55 are shifted to the right.

A line 103a branching from the line 103 is connected to the right end of the FWD pressure-switching valve 40 such that the line pressure P1 pushes a spool 41 in the FWD pressure-switching valve 40 to the left. The line pressure P1 is supplied to the left end of the FWD pressure-switching valve 40 through a line 104 branching from the line 103, through a groove on the spool 36 in the L-H shift valve 35, which has been shifted to the left, and then through a line 105. A line 106 branching from the line 104 is connected to the right end of the REV pressure-switching valve 45 such that a spool 46 in the REV pressure-switching valve 45 is kept shifted to the left by the line pressure P1.

A line 107 branching from the line 103 is connected to the solenoid valve SC, to supply the line pressure P1 thereto.

In the above described ways, the line pressure P1 is supplied to each of the solenoid valves SA~SF, which are controlled to open or close for the purpose of controlling supply of the line pressure P1.

First, establishing the 1ST speed range is described. As the solenoid valve SF is not involved in establishing a forward range, only the solenoid valves SA~SE will be included in the description as shown in Table 2.

With reference to Table 2, only the solenoid valve SC is turned on, and the other solenoid valves are turned off for the 1ST speed range. As a result, only the solenoid valve SA opens, and the other solenoid valves close. When the solenoid valve SA opens, the line pressure P1 is supplied from the line 125 to a line 130 and then to a line 131 through a groove on the spool 26 at position D of the manual valve 25.

A line 131a branching from the line 131 is connected to the right end of the relief valve 55 such that the line pressure P1 acts on the right end of the relief valve 55. Furthermore, the line pressure P1 is supplied to the first clutch CL1 through a line 132 branching from the line 131, whereby the first clutch CL1 is actuated for engagement, and pressure change which occurs in the first clutch CL1 is regulated by the first accumulator 71.

The second clutch CL2 is connected to the drain through the relief valve 55, whose spools 56 and 57 are shifted to the right, and through the solenoid valve SB. The third clutch CL3 is connected to the drain through the solenoid valve SC, and the first brake B1 is connected to the drain through the relief valve 55 and the solenoid valve SD. The second brake B2 is connected to the drain through the manual valve 25. Therefore, only the first clutch CL1 engages to establish the 1ST speed range.

Next, description is made of establishing the 2ND speed range. As shown is in Table 2, the solenoid valve SD is turned on, and it opens. As a result, the line pressure P1 is supplied to the first brake B1 from the line 123 through a line 140 and the relief valve 55, whose spools 56 and 57 are shifted to the right, and through a line 141. Therefore, the first clutch CL1 and the first brake B1 engage to establish the 2ND speed range.

For establishing the 3RD speed range, the solenoid valve SC is turned off, and the solenoid valve SD is also turned off. Because the solenoid valve SD is returned to off, the first brake B1 is released. As the solenoid valve SC is turned off and opened, the line pressure P1 is supplied to the third clutch CL3 from the line 107 through a line 145. As a result, the third clutch CL3 engages to establish the 3RD speed range.

At the same time, the line pressure P1 acts on the left-hand portion of the delivery valve 50 through a line 146 branching from the line 145 and also acts on the right end of the relief valve 55 through a line 147 branching from the line 145.

For establishing the 4TH speed range, the solenoid valve SB is turned on, and the solenoid valve SC is also turned on. As the solenoid valve SC is returned to on, the third clutch CL3 is released. As the solenoid valve SB opens, the line pressure P1 is supplied to the second clutch CL2 from the line 124 through lines 150 and 152 and a groove on the spool 56 shifted to the right in the relief valve 55 and through a line 151. As a result, the second clutch CL2 engages to establish the 4TH speed range.

For establishing the 5TH speed range, the solenoid valve SA is turned on, and the solenoid valve SC is turned off. As the solenoid valve SA is switched from off to on, the supply of the line pressure P1 to the line 130 is cut off, and the first clutch CL1 is connected to the drain through the solenoid valve SA. As a result, the first clutch CL1 is released. As the solenoid valve SC opens, the third clutch CL3 engages as described previously. As a result, the 5TH speed range is established.

Figure 5:
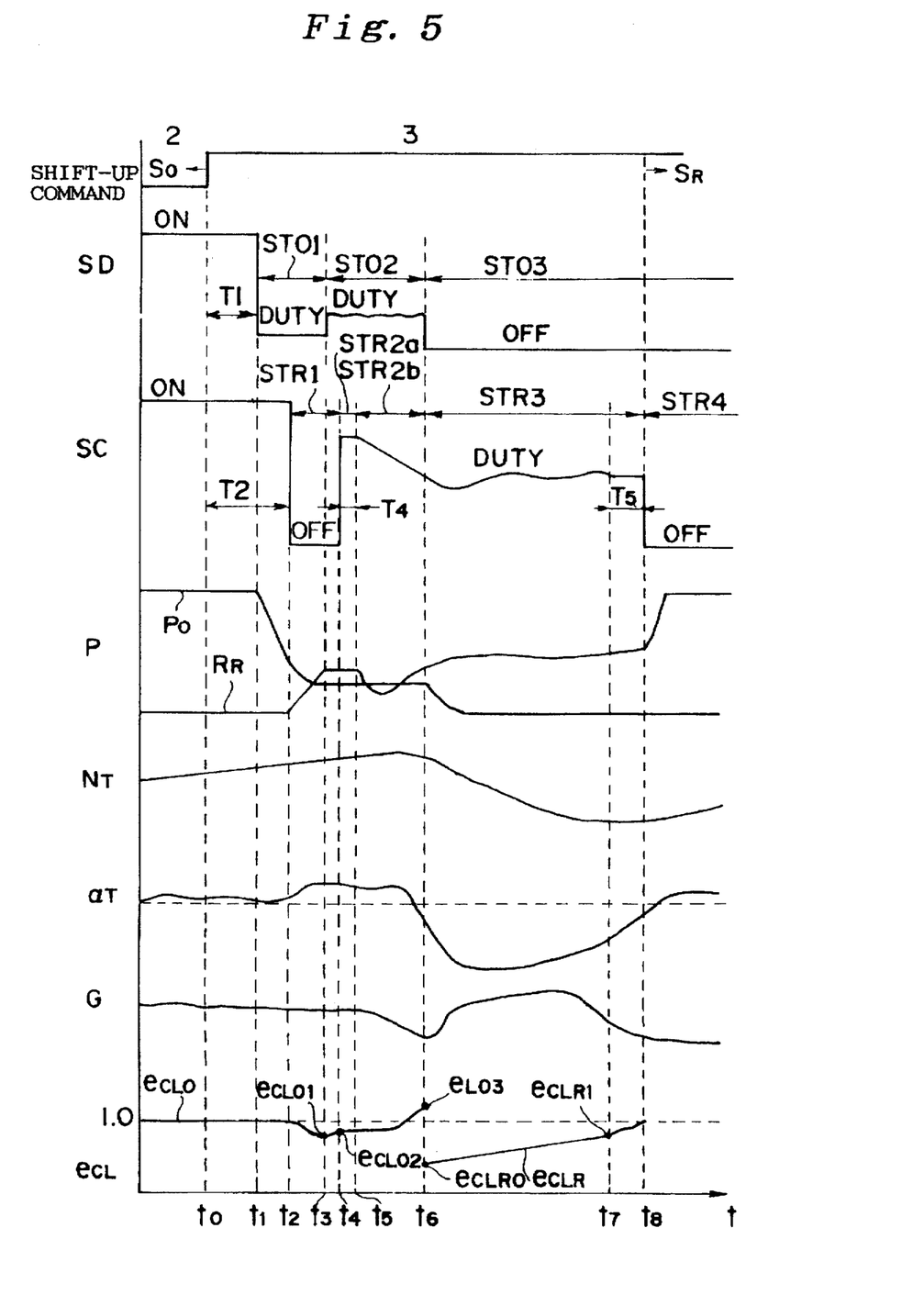
FIG. 5 is a chart showing chronological changes of various parameters while a power-on shift-up control is carried out in accordance with the shift control method.
Figure 6:
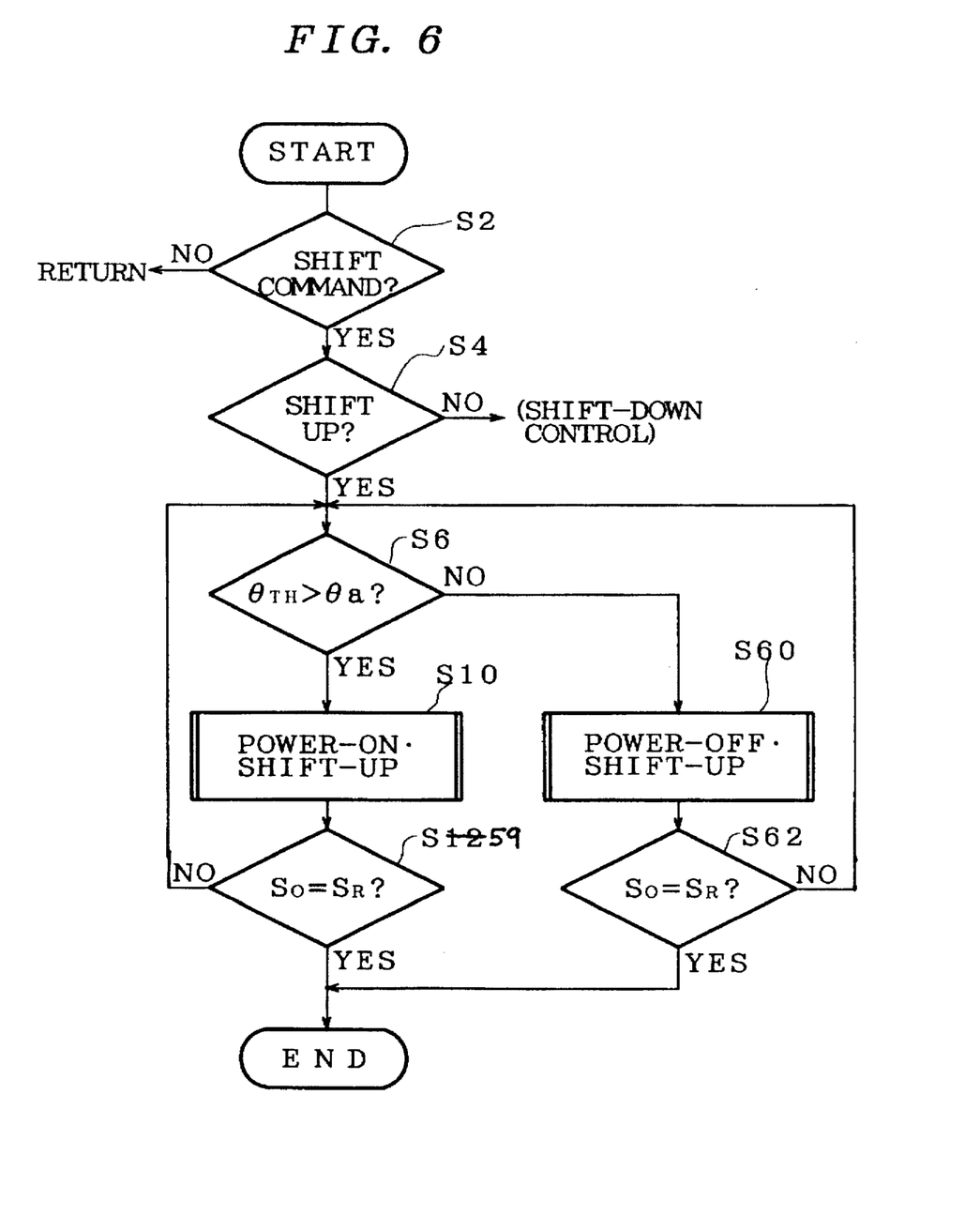
FIG. 6 is a flowchart showing processes effected in the shift control method.

The clutches and brakes are controlled for engagement and disengagement in the manner described above. Now, an engagement control for shifting up is described with reference to a timing chart in FIG. 5 and flowcharts in FIGS. 6, 7 and 8. As shown in the flowchart of FIG. 6, determination is made whether there is a shift command or not at step S2. If a shift command is detected, then determination is made whether it is a shift-up command or not at step S4. If it is a shift-up command, then the control flow proceeds to step S6. There, determination is made whether the throttle opening θTH, which is operated with the accelerator pedal, is greater than a predetermined value θa or not. If the throttle opening θTH is judged greater than the predetermined value θa (θTH>θa), then the control flow proceeds to step 10 for execution of a power-on shift-up control. On the other hand, if the throttle opening θTH is judged equal to or smaller than the predetermined value θa (θTH≦θa), then it proceeds to step 60 for execution of a power-off shift-up control.

Figure 7:
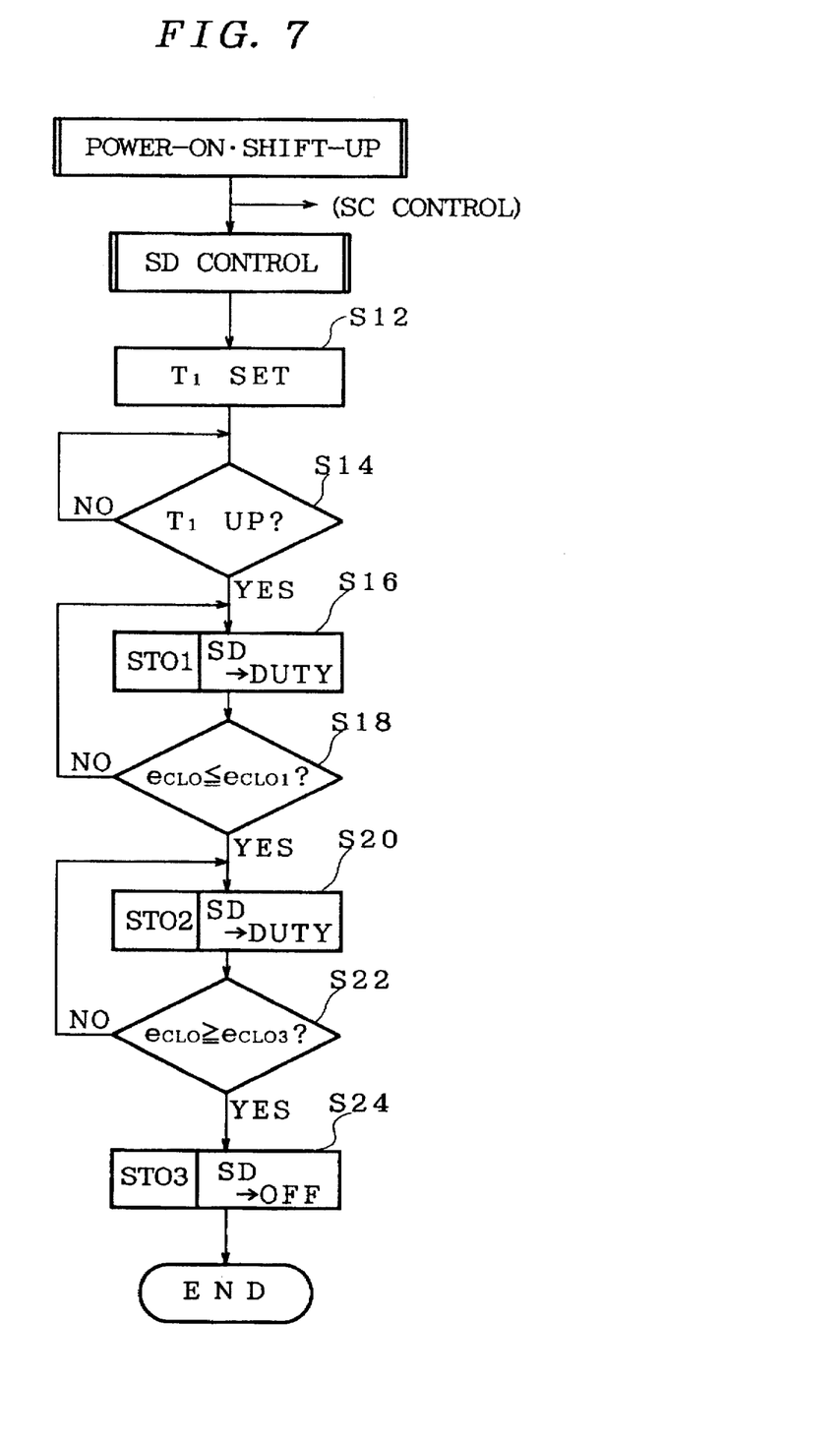
FIG. 7 is another flowchart showing processes effected in the shift control method.
Figure 8:
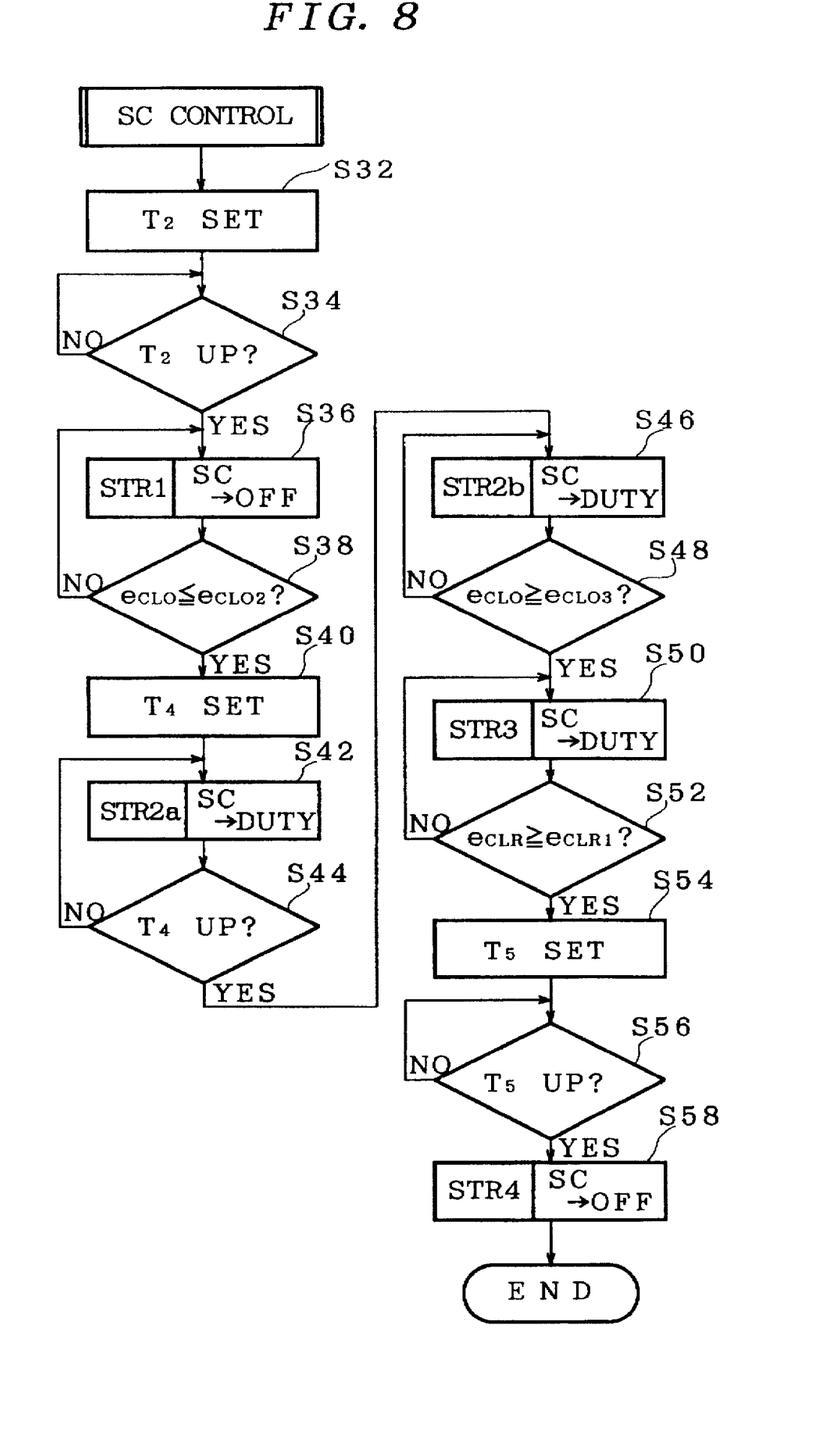
FIG. 8 is yet another flowchart showing processes effected in the shift control method.

The power-on shift-up control is carried out in accordance with the steps of follow charts in FIGS. 7 and 8. Here, description is made for a case in which a shift-up command from the 2ND speed range to the 3RD speed range is generated at time to as shown in the timing chart.

In this power-on shift-up control, the solenoid valve SD establishing the 2ND speed range (oft-going speed range) and the solenoid valve SC to establish the 3RD speed range (on-coming speed range) are controlled. Signals for setting the solenoid valves SD and SC on or off and their duty cycles are referred to as "pressure command signal" in the claims, and they are shown in the timing chart as SSD and SSC. In the control flow of the solenoid valve SD shown in FIG. 7, immediately after the shift-up command has been generated, counting starts for a predetermined time period T1 at step S12. At the same time, in the control flow of the solenoid valve SC shown in FIG. 8, immediately after the shift-up command has been generated, counting starts for a predetermined time period T2 (>T1) at step 32. During these time periods, the turbine rotational speed NT increases because of power-on condition.

If the elapse of the predetermined time period T1 is determined at step S14 of the control flow of the solenoid SD (time t1), then the control flow proceeds to step S16 to initiate an off-going-range releasing stage STO1. In this off-going-range releasing stage STO1, the solenoid valve SD is controlled at a low duty cycle as shown in the timing chart. As a result, the engagement-actuating pressure PO (hereinafter referred to only as "pressure") of the first brake B1, which has been in complete engagement, rapidly decreases, and the engaging force thereof weakens to allow slipping. Therefore, the turbine rotational speed NT increases a little (to a degree in which engine racing is not allowed) because of the slip in the first brake B1 (refer to the turbine rotational acceleration αT). In the control apparatus, calculation is made for the input/output rotational speed ratio eCLO of the first brake B1 from the values detected by the input and output rotation sensors 9a and 9b and the gear ratio of the 2ND speed range (=rotational speed of output gear 4 x gear ratio of 2ND speed range/rotational speed of input shaft 3).

On the other hand, if the elapse (time t2) of the predetermined time period T2 is determined at step S34 of the control flow of the solenoid SC, then the control flow proceeds to step S36 to initiate an on-coming-range invalid-stroke-clearing stage STR1. In this on-coming-range invalid-stroke-clearing stage STR1, the solenoid valve SC is turned off as shown in the timing chart. As a result, the line pressure is supplied to the third clutch CL3, which has been in disengagement, and the pressure PR thereof increases to clear the invalid stroke of the third clutch CL3 quickly. In the control apparatus, calculation is made for the input/output rotational speed ratio eCLR of the third clutch CL3 from the values detected by the input and output rotation sensors 9a and 9b and the gear ratio of the 3RD speed range (=rotational speed of output gear 4 x gear ratio of 3RD speed range/rotational speed of input shaft 3).

While the invalid stroke of the third clutch CL3 is being eliminated, the input/output rotational speed ratio eCLO of the first brake B1 becomes gradually small. When this ratio eCLO is determined smaller than a first predetermined value eCLO1 (<1.0) at step S18 (time t3), the control flow of the solenoid valve SD proceeds to step S20 to execute an off-going-range controlling stage STO2. In this off-going-range controlling stage STO2, a real input/output rotational speed ratio eCLO is fed back to calculate a pressure value necessary for the first brake B1 to be adjusted to so that a target input/output rotational speed ratio will be achieved. The solenoid valve SD is then controlled with a duty cycle which corresponds to this calculated pressure value. The above target input/output rotational speed ratio is selected such that the input/output rotational speed ratio eCLO of the first brake B1 is kept within a predetermined range which is closer to 1.0 (a range whose lower limit is defined by an input/output rotational speed ratio a little greater than the first predetermined value eCLO1). Thereby, the first brake B1 is kept slightly slipping, i.e., having a torque transmission capacity almost equivalent to the input torque. Therefore, while the off-going-range controlling stage STO2 is carried out, the turbine rotational speed NT (i.e., engine rotational speed) is prevented from racing.

While this off-going-range controlling stage STO2 is being carried out, the input/output rotational speed ratio eCLO of the first brake B1 becomes greater than the first predetermined value eCLO1 (i.e., approaches 1.0). If this ratio eCLO is judged equal to or greater than a second predetermined value eCL02 (<1.0) at step S38 (time t4), then the control flow of the solenoid valve SC proceeds to step S40 to initiate counting for a predetermined time period T4 (referred to as "first predetermined time period" in claims). Then, it proceeds to step 42 to execute a on-coming-range first stand-by stage STR2a. At this moment, the clearing of the invalid stroke of the third clutch CL3 is almost complete, and the third clutch CL3 is in a preengagement condition in which it is just about to start engagement or in a preliminary engagement condition in which very little torque is transmitted.

In this on-coming-range first stand-by stage STR2a, the duty cycle of the solenoid valve SC is increased to set the pressure PR of the third clutch CL3 so that the third clutch CL3 is kept in the above mentioned preengagement condition or preliminary engagement condition.

When the elapse of the predetermined time period T4 is determined at step S44 (time t5), the control flow of the solenoid valve SC proceeds to step S46 to execute an on-coming-range second stand-by stage STR2b. In this on-coming-range second stand-by stage STR2b, the duty cycle of the solenoid valve SC is gradually reduced from the duty cycle set for the on-coming-range first stand-by stage STR2a so as to gradually increase the pressure PR of the third clutch CL3 at a constant rate (referred to as "first predetermined rate" in claims) from the value set for the preengagement condition or preliminary engagement condition.

As the pressure PR of the third clutch CL3 increases, the share of the third clutch CL3 in the input torque increases, and that of the first brake B1 decreases. Thus, the first brake B1, which is slipping, is restrained from heating up and wearing down.

In this way, the input/output rotational speed ratio eCLO of the first brake B1 gradually approaches 1.0. When the pressure PR of the third clutch CL3 has increased to a certain degree, the turbine rotational speed NT declines relatively substantially. However, the output rotational speed will not decrease as much because of inertia, and the input/output rotational speed ratio eCLO of the first brake B1 exceeds 1.0. At this instance, the acceleration G of the vehicle changes a little.

If the input/output rotational speed ratio eCLO is determined equal to or greater than a third predetermined value eCLO3 (>1.0) at step S22 and step 48 (time t6), then each flow proceeds to step S24 and to step S50, respectively. At step S24, the control of the solenoid valve SD initiates an off-going-range third stage STO3. In this off-going-range third stage STO3, the solenoid valve SD is turned off to release the first brake B1.

On the other hand, at step S50, the control of the solenoid valve SC initiates an on-coming-range controlling stage STR3. In this on-coming-range controlling stage STR3, the solenoid valve SC is controlled at a duty cycle so that the input/output rotational speed ratio eCLR of the third clutch CL3 approaches 1.0 at a constant rate (referred to as "second predetermined rate" in claims). Therefore, the pressure PR of the third clutch CL3 increases gradually, and the turbine rotational speed NT decreases gradually.

If the input/output rotational speed ratio eCLR of the third clutch CL3 is determined greater than a fourth predetermined value eCLR1 at step S52 (time t7), then the control flow of the solenoid valve SC proceeds to step S54 to initiate counting for a predetermined time period T5. While this counting is being carried out, the on-coming-range controlling stage STR3 is continued. When the elapse of the predetermined time period T5 is determined at step 56, the control flow proceeds to step S58 to initiate an on-coming-range fourth stage STR4. In this on-coming-range fourth stage STR4, the solenoid valve SC is turned off to completely engage the third clutch CL3 (time t8). Thereafter, the turbine rotational speed NT increases gradually in correspondence with the throttle opening θTH.

After the input/output rotational speed ratio eCLR has become the fourth predetermined value eCLR1 close to 1.0, and then the predetermined time period T5, which expectedly allows the input/output rotational speed ratio eCLR to become almost 1.0, has elapsed; the third clutch CL3 engages completely.

As described above, a shift from the 2ND speed range to the 3RD speed range in power-on condition completes (step 12).

A power-off shift-up control is similarly executed in accordance with flowcharts similar to those in FIGS. 7 and 8. The timing chart of FIG. 9 describes a case where the accelerator pedal is returned in the middle of the off-going-range releasing stage STO1. In this case, the off-going-range releasing stage STO1 of the power-on shift-up control switches to the off-going-range releasing stage STO1 of the power-off shift-up control at time t1 when the accelerator pedal is returned.

Figure 9:
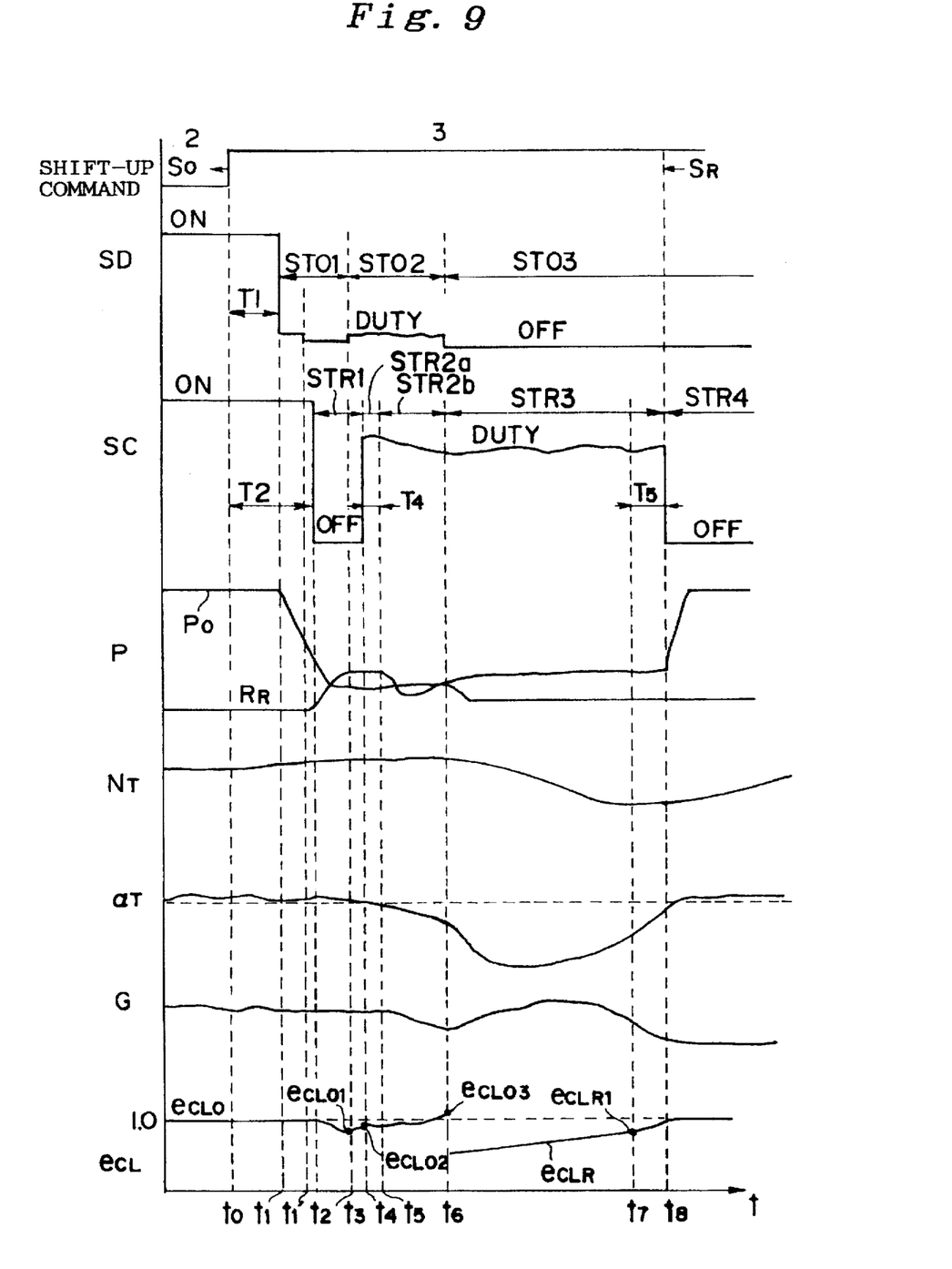
FIG. 9 is another chart showing chronological changes of various parameters while a power-off shift-up control is carried out in accordance with the shift control method.

In this power-off condition, because the input torque is smaller than that in the power-on condition, a smaller duty cycle is applied to the solenoid valve SD for the off-going-range releasing stage STO1 and the off-going-range controlling stage STO2, and a smaller duty cycle is also applied to the solenoid valve SC for the on-coming-range first and second stand-by stages STR2a and STR2b and the on-coming-range controlling stage STR3. Other predetermined values are also different from those applied in the power-on condition. Especially, it is preferable that the predetermined time periods T1 and T2 be set to zero so that immediately after the shift-up command is generated, the slip control (off-going-range releasing stage STO1) of the first brake B1 will be initiated, and almost at the same time, the invalid-stroke elimination control (on-coming-range invalid-stroke-clearing stage STR1 ) of the third clutch CL3 will be initiated. In this way, the time required for the shift control can be shortened.

It is necessary for the control to switch into the same control stage when the power-on shift-up control and the power-off shift-up control are switched to each other in the middle of any control stage (i.e., to avoid reprocessing from the beginning of the control flow to which the control has just switched). For this reason, it is preferable that flagging steps be provided in the flowcharts so that an indication is established for the completion of each determination of the elapse of the predetermined time periods T1 and T2 and of each control stage. For example, in a control similar to that shown in FIG. 9, if the elapse of the predetermined time period T1 is flagged, then the off-going-range releasing stage STO1 will be initiated immediately after switching while the counting of the predetermined time period T2 is continued.

In the above control, the input/output rotational speed ratio is defined as (rotational speed of output shaft x gear ratio/rotational speed of input shaft). However, it may also be defined as (rotational speed of input shaft x gear ratio/rotational speed of output shaft) in a shift control method according to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 7-101781 filed on Apr. 3, 1995, which is incorporated herein by reference.

What is claimed is:

1. A shift control method for an automatic transmission which includes a plurality of power transmission paths provided between input and output members, a plurality of engaging elements for selectively establishing said power transmission paths, and engagement-controlling means for controlling engagement-actuation pressures of said engaging elements in response to pressure command signals; said engagement-controlling means carrying out a shift-up control from an off-going range to an on-coming range by releasing an off-going engagement element in response to a shift-up command; comprising the steps of releasing an off-going engaging element at an off-going-range controlling stage by generating a pressure command signal which quickly lowers the engagement-actuation pressure of said off-going engaging element, controlling said off-going element at an off-going-range controlling stage by generating a pressure command signal which controls the engagement-actuation pressure of said off-going engaging element such that said off-going engaging element is kept slipping within a predetermined range of input/output rotational speed ratio (=output rotational speed/input rotational speed), and clearing an invalid stroke of an on-coming engaging element at an oncoming-range invalid-stroke-clearing stage by generating a pressure command signal which sets the engagement-actuation pressure of said on-coming engaging element to a predetermined high-pressure necessary for said on-coming engaging element to clear an invalid stroke; and characterized by initiating said on-coming-range invalid-stroke-clearing stage in response to said shift-up command;

proceeding through the shift-up control from said off-going-range releasing stage to said off-going-range controlling stage when the input/output speed ratio of said off-going engaging element reaches a first predetermined value in said off-going-range stage;

generating a pressure command signal for engaging said on-coming engaging element in a predetermined engaging pattern when the input/output speed ratio of said off-going engaging element reaches a second predetermined value greater than said first predetermined value in said off-going-range controlling stage; and generating a pressure command signal for completely releasing said off-going engaging element when the input/output speed ratio of said off-going engaging element reaches a third predetermined value greater than said second predetermined value in said off-going-range controlling stage.

2. The shift control method as set forth in claim 1 wherein:

said shift-up command is a power-on shift-up command which is executed while a throttle is kept open.

3. The shift control method as set forth in claim 2 wherein:

said first predetermined value is a value smaller than 1.0;

said second predetermined value is a value greater than said first predetermined value but smaller than 1.0; and said third predetermined value is a value greater than 1.0.

4. The shift control method as set forth in claim 2, further including the steps of initiating said off-going-range releasing stage when a first predetermined time period T1 has elapsed after the generation of said power-on shift-up command; and initiating said on-coming-range invalid-stroke-clearing stage when a second predetermined time period T2 (>T1) has elapsed after the generation of said power-on shift-up command.

5. The shift control method as set forth in claim 2 wherein:

said predetermined engaging pattern which is executed when the input/output rotational speed ratio of said off-going engaging element reaches said second predetermined value in said off-going-range controlling stage comprises a step of generating a pressure command signal at an on-coming-range stand-by stage for increasing the engagement-actuation pressure of said on-coming engaging element at a first predetermined rate from a predetermined pressure.

6. The shift control method as set forth in claim 5 wherein:

said on-coming range stand-by stage comprises the steps of:

generating a pressure command signal at an on-coming-range first stand-by stage for keeping the engagement-actuation pressure of said on-coming engaging element at said predetermined pressure for a predetermined time period; and generating a pressure command signal at an on-coming-range second stand-by stage for increasing the engagement-actuation pressure of said on-coming engaging element at said first predetermined rate, following said on-coming-range first stand-by stage.

7. The shift control method as set forth in claim 5 further comprising the steps of generating a pressure command signal at an on-coming-range controlling stage for controlling the engagement-actuation pressure of said on-coming engaging element in such a way that the input/output rotational speed ratio of said on-coming engaging element will approach 1.0 at a second predetermined rate; and proceeding through the shift-up control from said on-coming-range stand-by stage to said on-coming-range controlling stage when the input/output rotational speed ratio of said off-going engaging element reaches said third predetermined value in said off-going-range controlling stage.

8. The shift control method as set forth in claim 7 further comprising the step of:

generating a pressure command signal for engaging said on-coming engaging element completely when a predetermined time period T5 elapses after the input/put rotational speed ratio of said on-coming engaging element has reached a fourth predetermined value approximately 1.0 in said on-coming-range controlling stage.

9. The shift control method as set forth in claim 1 wherein:

said shift-up command is a power-off shift-up command which is executed while the throttle is kept substantially closed.

10. The shift control method as set forth in claim 9 wherein:

said first predetermined value is a value smaller than 1.0; said second predetermined value is a value greater than said first predetermined value but smaller than 1.0; and said third predetermined value is a value greater than 1.0.

11. The shift control method as set forth in claim 9 further comprising the step of:

executing said off-going-range releasing stage and said on-coming-range invalid-stroke-clearing stage almost at the same time said power-off shift-up command is generated.

* * * * *

UNITED STATES PATENT AND TRADEMARK OFFICE
CERTIFICATE OF CORRECTION

PATENT NO.   : 5,704,874
DATED        : January 6, 1998
INVENTOR(S)  : Shimada et al.

It is certified that error appears in the above-identified patent and that said Letters Patent is hereby corrected as shown below:

<u>Title page,</u>
Item [57], ABSTRACT,
Line 1, after "method" insert -- for an automatic transmission --.

<u>Column 11,</u>
Line 34, delete "quickly" and insert -- immediately --;
Line 56, delete the word "said" and insert -- an --;
Line 60, after "range" insert the word -- releasing --.

Signed and Sealed this

Twenty-fifth Day of June, 2002

*Attest:*

*Attesting Officer*

JAMES E. ROGAN
*Director of the United States Patent and Trademark Office*